United States Patent [19]

Chang et al.

[11] Patent Number: 4,873,158
[45] Date of Patent: Oct. 10, 1989

[54] OVERDISCHARGE PROTECTION FOR RECHARGEABLE CELLS

[75] Inventors: On-Kok Chang; John C. Hall, San Jose; Jeffrey Phillips, Saratoga; Lenard F. Silvester, Scotts Valley, all of Calif.

[73] Assignee: Altus Corporation, San Jose, Calif.

[21] Appl. No.: 244,488

[22] Filed: Sep. 14, 1988

[51] Int. Cl.$^4$ .................. H01M 2/00; H01M 4/02; H01M 2/14
[52] U.S. Cl. .................. 424/61; 429/94; 429/129; 429/211; 429/247
[58] Field of Search .................. 428/61, 94, 211, 129, 428/247

[56] References Cited

U.S. PATENT DOCUMENTS

| | | | |
|---|---|---|---|
| 3,900,340 | 8/1975 | Greaser et al. | 429/94 |
| 4,129,686 | 12/1978 | Kaduboski | 429/61 |
| 4,622,277 | 11/1986 | Bedder et al. | 429/94 |

Primary Examiner—Stephen J. Kalafut
Attorney, Agent, or Firm—Limbach, Limbach & Sutton

[57] ABSTRACT

A rechargeable electrochemical cell which resists venting in an over-discharge condition. A first microporous membrane is provided as a separator between the cell's anode and cathode, which allows for the passage of cell electrolyte, but inhibits the passage of metal dendrites. A tab extends from the anode to the cell casing and between the tab and inner wall of the cell casing is provided a second microporous membrane characterized as being less resistant to the passage of alkaline metal dendrites than the first microporous membrane.

5 Claims, 2 Drawing Sheets

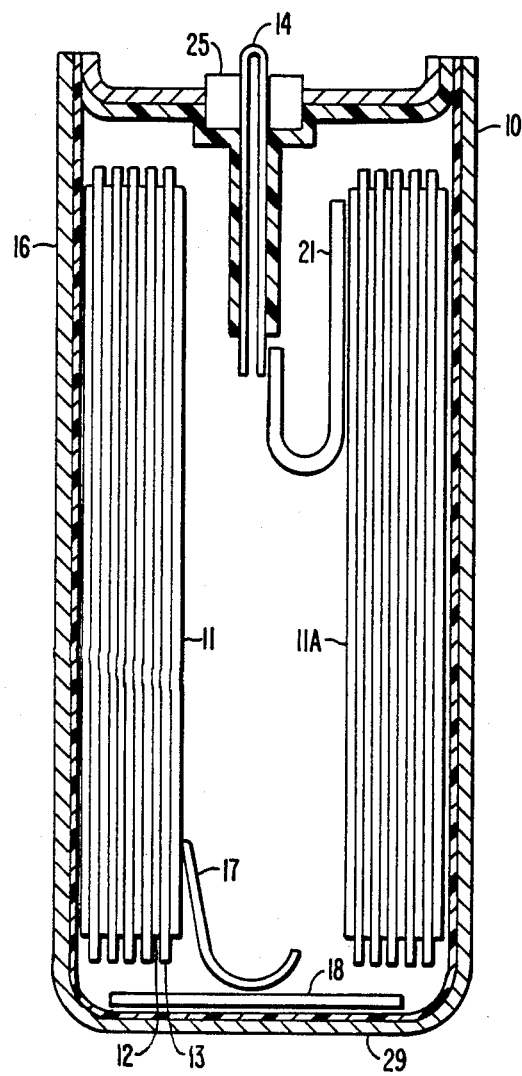
FIG._1.

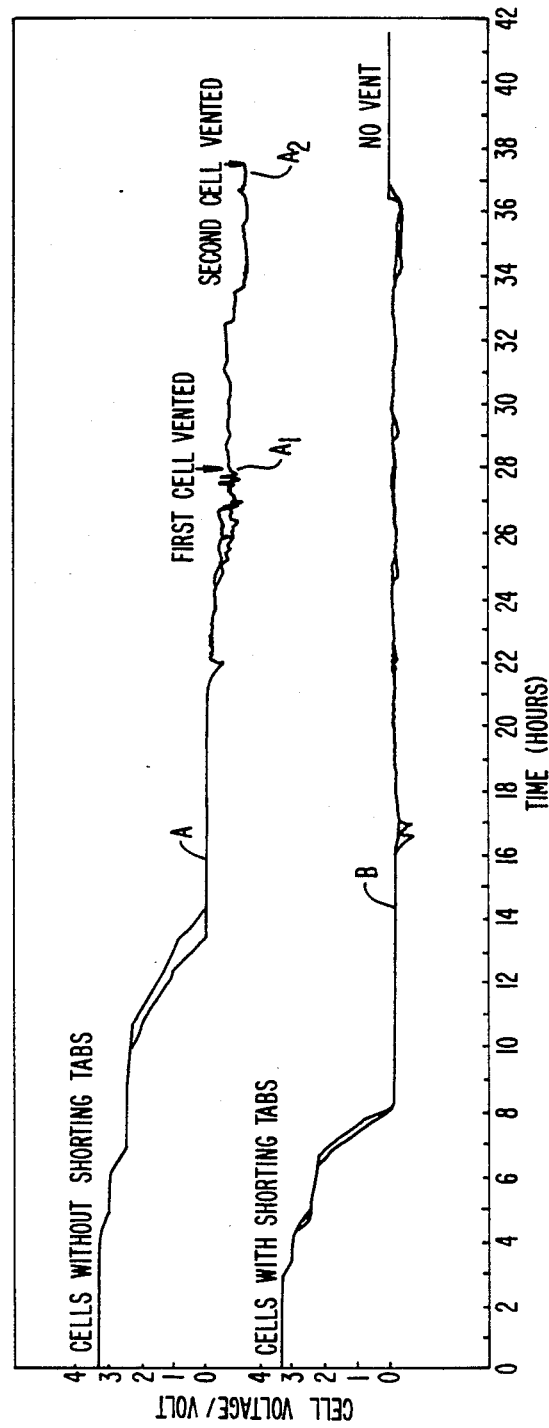

OVERDISCHARGE PROTECTION FOR RECHARGEABLE CELLS

TECHNICAL FIELD OF INVENTION

The present invention deals with rechargeable electrochemical cells and means for preventing venting during overdischarge.

BACKGROUND OF THE INVENTION

This invention relates, generally, to non-aqueous electrochemical cells, and more particularly to inorganic cells employing an alkaline metal, such as lithium, as the anode with a cathode or cathode collector separated from the anode by a separator membrane. Cells of this nature have been provided either in the form of flat parallel plates of anode, separator and cathode material, or as spirally wound elements nested within a suitable container.

Commercial electrochemical cells referred to as lithium/$SO_2$ cells, typically contain lithium anodes and electrolytes comprised of a salt such as LiBr dissolved in a solvent mixture of liquified $SO_2$ and an organic co-solvent, such as acetonitrile. Cathodes of such cells are usually comprised of carbon black, such as Shawinigan (acetylene black), formed on an expanded metal substrate.

Discharge of such cells results in the formation of anode metal dithionite at the carbon cathode surface. In such cells, the $SO_2$ fluid cathode depolarizer acts directly with the anode metal cation to form such dithionite product. Since the cathode reaction is a direct one between the anode and fluid cathode depolarizer, the carbon cathode collector only provides a catalytic surface for such reaction.

The high energy density of such cells permits high currents to be drawn from them, particularly when the electrodes are spirally wound together. Such a cell design, while permitting high current drains, is susceptible to being rendered unsafe when subjected to certain conditions. For example, it is very difficult to manufacture cells having identical capacities. Therefore, when cells are discharged in series, it is quite possible that one cell will exhaust its capacity before the others. Also, during overcharge, the cell is caused to be in a state of voltage reversal, causing electrochemical reactions to occur which generate heat and lead to bulging or venting.

It is recognized that non-aqueous electrochemical cells having lithium or similar alkaline metal anodes commonly have a lower cycle life than comparable aqueous systems which employ cadmium or lead negative electrodes. A major cause of the death of such lithium cells is the formation of dendrites which grow from the lithium electrode and make electronic contact with complementary positive electrodes.

There have been various teachings of the problems resulting from dendrite growth between the anode and cathode. One such teaching can be found in U.S. Pat. No. 4,622,277 dated Nov. 11, 1986. In this reference, it is taught to use an exposed inert conductive metal coupled mechanically and electrically to the cathode and coupled mechanically and electrically to the anode. It is taught that when these electrodes are spirally wound, the two pieces of inert metal are oriented such that they face each other and are held in physical isolation by the separator which is interposed therebetween. During voltage reversal abuse, dendrites grow from the first segment of inert metal to the dendrite target, thereby creating a low resistance pathway between the two pieces of inert metal. It is taught that this prevents the potentially detrimental intermixing of anode material into the cathode to provide a shunt for the current to pass through the reverse cell without generating excessive heat.

Although approaches such as those shown in U.S. Pat. No. 4,622,277 work effectively to avoid venting in primary non-aqueous electrochemical cells, such solutions are not appropriate when dealing with secondary or rechargeable systems. There are various reasons why primary cell technology cannot be extended directly to prevent venting in secondary cells. For example, there is normally a dendrite-resistant separator present between electrodes in a secondary cell to prevent lithium shorts during charge. Further, solutions are normally selected for the capability of depositing non-dendritic lithium deposits in a secondary system. Common electrolytic solutions for use herein contain, for example, the salt of lithium aluminum tetrachloride and sulfur dioxide.

Cells of the type contemplated for use herein generally are provided with a cathode or cathode collector of a carbonaceous material and further containing a positive active material such as cupric chloride. This positive active material encourages dendrite growth and in the event of the elimination of a microporous separator which was resistant to the passage of alkaline metal dendrites, the cell would tend to short during normal discharge. As such, it has been found that the cell must be provided with over-discharge protection in an area remote from the cell stack.

It is thus an object of the present invention to provide a non-aqueous electrochemical cell having been prevented from venting by providing a mechanism to create a dendritic short external to the cell stack during excessive over-discharge.

This and further objects of the present invention will be more readily appreciated when considering the following discussion and appended drawings, wherein FIG. 1 is a cross-sectional view of a typical non-aqueous electrochemical cell produced according to the present invention; and FIG. 2 is a strip chart comparing the results of cells produced by the prior art and those produced according to the present invention.

SUMMARY OF THE INVENTION

The present invention deals with a rechargeable electrochemical cell comprising a cell casing having sidewalls, a top and bottom which houses the various cell elements. These elements consist of a positive terminal, a negative terminal, an anode of alkaline metal, such as lithium, connected to the negative terminal, a cathode connected to the positive terminal and a non-aqueous electrolyte substantially filling the void volume within the cell casing. A first microporous membrane is employed, separating the anode from the cathode. The first microporous membrane is characterized as allowing the flow of electrolyte through the pores of the first microporous membrane, but inhibiting the passage of alkaline metal dendrites. A tab is provided of conductive material extending from at least one anode to a position proximate the cell casing. A second microporous membrane is located between the tab and cell casing which is characterized as being less resistant to the passage of alkaline metal dendrites than the first microporous membrane.

DETAILED DESCRIPTION OF THE INVENTION

The present invention can be most readily visualized by reference to FIG. 1, wherein cell casing 10, being electrically isolated from negative terminal 14 by insulator 25, is shown having sidewalls, a top and bottom housing the various active cell components. Under normal circumstances, anode 11a is physically and electrically connected to negative terminal 14 via tab 21 which can be comprised of any suitably conductive material which is not adversely affected by the proposed electrolyte which is, for example, lithium aluminum tetrachloride and sulfur dioxide. Such material should also be malleable and provide a good substrate for lithium deposition. Suitable candidates include copper, nickel and iron.

Under normal operating conditions, cell casing 16 is maintained at cathode potential, which acts as the positive terminal of the cell. Under these conditions, during normal cell discharge, it is obviously not a site for the deposition of lithium ions and is thus not a surface on which dendritic growth normally occurs.

However, during voltage overdischarge, the polarity of the cell casing becomes negative and lithium ion deposition occurs. As such, the exposed interior of the cell casing acts as a center for lithium deposition, with consequent dendrite formation external to the cell stack.

Under normal operation, dendrite contact between the anode 11 and cathode 12 is prevented by providing a first microporous membrane as separator 13. An example of a suitable material is a tetrafluoroethylene fluorocarbon polymer. Such a material is available from Raychem Corp. under the trademark TEFZEL. Ideally, such a product should possess pore sizes in the range of $0.2\mu$ to $2.0\mu$. This material is characterized as allowing the passage of electrolyte through its pores, but preventing dendritic metal from contacting the anode and cathode surfaces, which would create an electric short between these members.

Without the practice of the present invention, during overdischarge, dendrites would tend to grow from the inner walls of casing 16 and contact the cell stack, causing a violent and rapid discharge. This discharge would tend to overheat the cell, causing some vaporization of the electrolyte and consequent venting.

The present invention prevents this dangerous condition by providing tab 17, which is isopotential to anode 11 by its physical contact with one or more of the anode members. Tab 17 is extended from at least one anode to a position proximate the cell casing. The embodiment shown in FIG. 1, tab 17, is shown as extending proximate cell casing bottom 29.

Placed between tab 17 and its closest cell casing surface is a second separator 18. This can be a microporous membrane or a woven glass mat material, both of which must be characterized as being less resistant to the passage of alkaline metal dendrites than first microporous membrane 13.

In a cell such as is represented by $Li/LiAlCl_4(SO_2)_1$ $CuCl_2/C$ the electrolyte is an extremely conductive inorganic liquid. The active material is copper chloride which results in a high 3.4 V open circuit voltage. Under normal discharge conditions the inner casing wall is at positive potential and does not represent a reaction site whatsoever. However, during recharge the positive can and may evolve some chlorine at the end of charge with a resulting accumulation of lithium on the tab 17. This is further thickened during normal cycling.

During overdischarge when the case can become a site for lithium deposition, it is the lithium which has accumulated on tab 17 during the charge process which promotes dendrite growth through membrane 18 at a point where tab 17 is closest to the cell casing 16 and in the case of FIG. 1 casing bottom 29.

Two types of cells were assembled with and without the extra tab 17. Both cells were comprised of a jelly roll of 6 mil lithium separated from a 20 mil electrode consisting of a mixture of carbon and copper chloride pasted onto a pure nickel screen current collector. The separator in the wound element was microporous TEFZEL obtained from Raychem Corporation.

The cells were of a standard ALTUS design which includes a number of features designed to inhibit lithium deposition external to the cell stack. A major feature of this design is the coating of the long fill tube and underside of the cell cap with a non-porous TEFZEL layer which effectively electrically isolates these areas.

Tab 17 was spot welded to a nickel leader which was attached to the lithium electrode. The tab was 0.1 inches wide and was bent such that it remained pressed onto separator 18 located on the bottom of the can. Separator 18 was a microporous glass mat supplied by Whatman. The cell without tab 17 was identical in all other respects.

The non-aqueous electrochemical cells with and without tab 17 were discharged and then overdischarged, producing the strip chart of FIG. 2. Upper curve A represents two cells without tab 17 connected in series and subjected to force discharge. At $A_1$, the first cell vented, resulting in the unstable voltage/time curve, while the second cell vented at $A_2$. Lower curve B represents a force discharge of two cells with such tabs, again arranged in series. Although force discharge was achieved, no cell venting could be observed throughout the test cycle of 42 hours.

We claim:

1. A rechargeable electrochemical cell comprising a cell casing having side-walls, a top and bottom housing therein a positive terminal, a negative terminal, an anode of alkaline metal connected to the negative terminal, a cathode connected to the positive terminal, a non-aqueous electrolyte, a first microporous membrane separating said anode from said cathode being characterized as allowing the flow of electrolyte through the pores of the first microporous membrane but inhibiting passage of alkaline metal dendrites therethrough, a tab of conductive material extending from the anode to a portion proximate said cell casing and a second microporous membrane located between said tab and cell casing, said second microporous membrane being characterized as being less resistant to passage of alkaline metal dendrites than said first microporous membrane.

2. The rechargeable electrochemical cell of claim 1 wherein said cell casing is of the same electrical potential as said positive terminal.

3. The rechargeable electrochemical cell of claim 1 wherein said alkaline metal comprises lithium.

4. The rechargeable electrochemical cell of claim 1 wherein said first microporous membrane comprises tetrafluoroethylene fluorocarbon polymer having pores in the size range of $0.2\mu$ to $2.0\mu$.

5. The rechargeable electrochemical cell of claim 1 wherein said second microporous membrane comprises a glass mat having pores in the size range of no smaller than 20 microns.

* * * * *